Dec. 12, 1939.    L. N. MESTRE    2,183,462
LIGHTING SYSTEM
Filed June 11, 1937
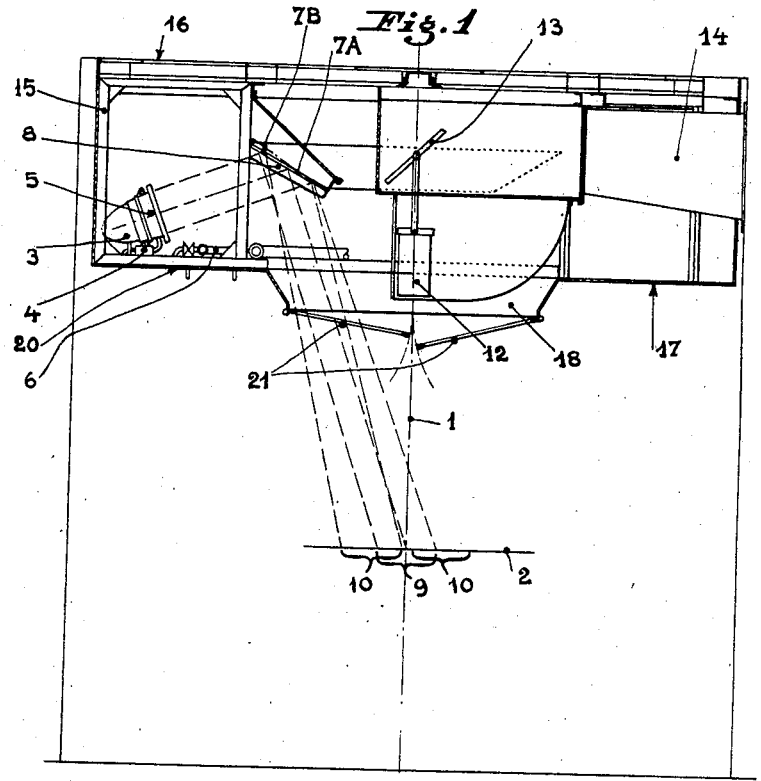
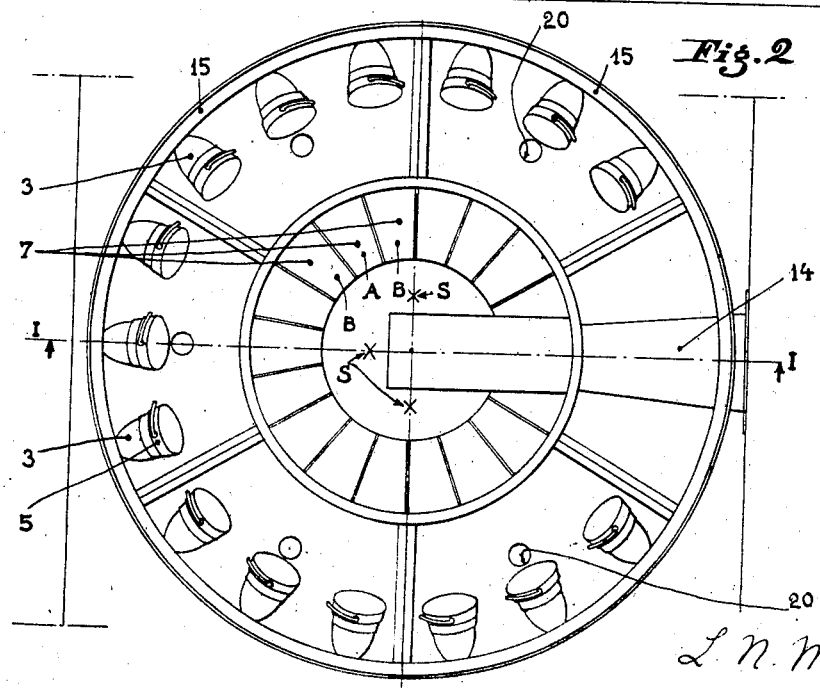
L. N. Mestre
INVENTOR
By Glascock Downing & Seibold
ATTYS Patented Dec. 12, 1939

2,183,462

UNITED STATES PATENT OFFICE 2,183,462

LIGHTING SYSTEM

Louis Nicolas Mestre, Paris, France, assignor to Anciens Etablissements Barbier, Benard & Turenne, Paris, France, a French company Application June 11, 1937, Serial No. 147,763
In France June 15, 1936

4 Claims. (Cl. 240—1.4)

My invention relates to an improved lighting system which enables a surface of definite area to be brightly illuminated and which can be arranged so that the area of said surface can be modified at will.

Said system, for which numerous applications can be found, is particularly but not exclusively intended to be combined with an episcopic apparatus and to be arranged in an amphitheatre or the like. In this application it provides the object to be illuminated, operating field or the like, with a sufficient luminosity for the image thereof which is projected on a screen, to enable all the spectators of a large amphitheatre to follow in its smallest details the demonstration or the like which is effected.

According to a characteristic of the invention, the lighting system comprises in combination, arranged about an axis perpendicular to the surface to be illuminated and passing through the centre of same, on the one hand a series of projectors producing substantially cylindrical luminous beams and, on the other hand, on the path of said beams, a reflecting surface in the form of at least a portion of an annulus which substantially envelops a trunconic surface of which the angle with said axis is such that the said beams are reflected and directed onto the surface to be illuminated.

Said system furthermore has amongst other advantages, that of avoiding any dazzling of the operator or operators (surgeon, assistant or the like) placed above the illuminated field and looking at same, owing to the fact that said operator or operators cannot receive in the angle of sight either a ray of the projectors, or a part of the luminous flux forming a convergent beam after reflection by said annulus. On the other hand, the separation of the luminous sources into a plurality of projectors which can be distributed about the room, avoids the considerable production of heat which is caused by the single projector, even when it is provided with a means for absorbing the infra-red rays, which is employed in the apparatus in use at the present time, and any transmission of heat by conduction can be avoided by means of a glass pane which advantageously closes the opening for the passage of the illuminating flux.

The reflecting annulus or portion of an annulus which is included in the scope of the present invention by way of a new product of manufacture, can comprise a series of plane mirrors which are in general adjacent and of which the surface is limited by a trapezium, and each of which corresponds to one of the aforesaid projectors and reflects the beam emitted by the corresponding projector.

According to a preferred embodiment, the aforesaid annulus comprises a group of mirrors reflecting the light onto a circular zone and another group of mirrors of which the slope is somewhat different from that of the aforesaid group of mirrors and which reflect the light onto an annular zone adjacent the said circular zone and can have a common portion with the latter. This arrangement enables a homogeneously illuminated zone to be produced, the surface of which can attain a considerable area and be variable according to whether all the projectors are operating or only those corresponding to one of the series of mirrors.

This embodiment, which will subsequently be solely referred to, corresponds moreover to the most usual case in practice, but it is obvious that a third series of mirrors could be provided and adapted to illuminate an annular zone adjacent the aforesaid annular zone.

Finally, the present invention also includes within its scope an assembly formed by the combination of the lighting system with an episcopic apparatus arranged, if necessary, so that it can be adapted to the fields, which are two or more in number, corresponding to the luminous zones illuminated as hereinbefore indicated, the projected image constantly occupying the same surface of the screen.

The aforesaid episcopic apparatus is preferably arranged inside the reflecting annulus which has a gap serving for the passage of the emergent luminous beam which is advantageously directed onto the projection screen through a cone or the like having an opaque surface, isolating it from the luminous surrounding of the projectors.

This latter embodiment provides a decrease in the height dimension of the assembly which can be fixed to the ceiling and concealed by false cornices, whereby, from an esthetic standpoint, the amphitheatre is given the appearance corresponding to the new trend of architecture, since only the central opening of the apparatus remains visible, enables the servicing of the apparatus to be facilitated, and the closing of the central opening by the hereinbefore mentioned pane of glass ensures the observance of the principles of asepsis which are indispensable when the apparatus is placed in a surgical demonstration amphitheatre.

Other characteristics and advantages of the invention will moreover appear from the ensuing description, with reference to the accompanying drawing which is given solely by way of example and in which:

Fig. 1 is a section along the line I—I of Fig. 2 of an assembly according to the invention.

Fig. 2 is a corresponding plan view thereof.

According to the aforesaid embodiment, the apparatus comprises, about an axis 1 which is perpendicular to the surface 2 to be illuminated and which passes through the centre of the latter, a series of projectors 3 each of which can have an independent lighting control, and which are carried by separate pedestals 4.

Each of said projectors 3 includes a luminous source formed by a lamp of great brightness placed at the focus of a reflector, and of which the power is conditional on the limit of temperature elevation of the surface 2 to be illuminated. Said temperature elevation is moreover reduced to a minimum by a water circulation tank 5, adapted to the front part of each projector to absorb the infra-red rays, and connected to pipes 6 for the supply and outflow of water, and by the elimination of any communication between the enclosure in which the projectors are located and the room, as will be explained hereinafter.

The luminous beam of each projector is directed onto a mirror 7 forming a part of a ring of adjacent trapezoidal mirrors enclosing substantially a frustum of a cone centered on the axis 1, and having a gap of relatively small angular opening 60° in the example shown.

The mirrors 7, which advantageously adjustable screens 8 separate from each other so as to prevent the luminous beam of a projector from encroaching on the mirror for which it is not intended, are inclined so as to reflect on the surface 2 to be illuminated the luminous flux which they receive.

In the example shown, said mirrors have two different slopes relatively to the vertical, the least inclined mirrors being designated by the letter A (one of these is shown in section in Fig. 1) and the most inclined mirrors of which the direction is indicated by a chain dotted line in the same figure being designated by the letter B.

As shown in Fig. 2, twice as many mirrors B have been provided as mirrors A, each mirror A being between two mirrors B. In this case, there are five mirrors A and ten mirrors B.

The mirrors A are arranged so as to uniformly illuminate a circular zone 9 (which has been assumed to be 30 cm. in diameter) whereas the mirrors B illuminate an annular zone 10 surrounding the zone 9 with which it has a common portion (the outer diameter has been assumed to be 60 cm.). All the projectors 3 or those corresponding to the mirrors A alone are illuminated according to the field which it is desired to illuminate. This arrangement prevents any dazzling of the operator (surgeon or the like) placed above the said field and looking at same.

An episcopic apparatus, comprising an optical system 12 and a reversing mirror 13, is fixed to the inside of the annulus of mirrors 7. It is adapted to be directed on one or the other of the two above defined fields 9 and 10 having different surfaces and to project the image of said field onto a screen through a cone 14 fixed in the gap of the annulus and isolating the emerging beam from the luminous surrounding of the projectors.

To facilitate the prior adjustment and the mounting "in situ", the general frame of the apparatus carrying the pedestals 4 of the projectors 3 and the annulus of mirrors 7 is formed by a plurality of boxes 15 each of which can carry three projectors 3 and three mirrors 7 (two B and one A), a last box carrying the cone 14. Said boxes are intended to be fixed to the ceiling 16 of the amphitheatre while their lower surfaces 17 define a false ceiling having a central opening 18 serving for the passage of the luminous beams.

Said opening 18 is closed by a protecting glass 21 preferably formed, as shown, in two parts mounted on hinges, so as to facilitate the access into the lighting system. Such a glass avoids any communication between the lighting apparatus and the surrounding room; it is particularly useful as regards asepsis in the case in which the apparatus is mounted in a surgical operating room, and it has the advantage of avoiding any transmission of heat by conduction to the outside of the enclosure.

Apparatus for recording pictures or sounds, can be placed, without producing occultation, either on the edge of said central opening 18, or inside the apparatus, on each side of the mounting of the lens 12, for example at the three places indicated by the letter S in Fig. 2, so as to be outside the illuminating beams.

Finally the lower surface 17 of the boxes can carry windows 20 co-operating with devices not shown, for illuminating the amphitheatre or the like and also serving for illuminating the inside of the boxes, this latter illuminating being necessary to enable the servicing and the repairs of the assembly to be effected.

While I have described what I at present consider preferred embodiments of my invention, it will be obvious to those skilled in the art that various changes and modifications may be made without departing from my invention and I therefore aim in the appended claims to cover all such changes and modifications as fall within the true scope and spirit of my invention.

What I claim is:

1. In the combination of an illuminating system with reflecting means disposed about an axis and associated with said system to throw a hollow conical beam of light, an illuminating system including a number of projectors adapted to produce substantially cylindrical luminous beams and reflecting means, on the path of said beams between said projectors and said axis, said reflecting means having the form of at least one portion of an annulus, and consisting of adjacent mirrors a number of which envelops one trunconic surface and another number of which envelops another trunconic surface the angle of which with reference to said axis is somewhat different from the angle of said first named surface with reference to said axis, said two numbers of mirrors being adapted to reflect the light onto two concentric zones.

2. A combination as claimed in claim 1 wherein said concentric zones have a common part.

3. In the combination of an illuminating system with at least one circular row of reflectors disposed about an axis and associated with said system to produce a hollow conical beam of light, said reflectors including reflecting surfaces facing the opposite direction with reference to said axis, and said illuminating system including a plurality of projectors angularly spaced about said axis, the distance between said axis and projectors being greater than the distance between said axis and said reflectors, each of said projectors being adapted to produce a substantially cylindrical luminous beam directed against the reflecting surface of one of said reflectors which is disposed between said projector and said axis.

4. A combination as claimed in claim 3 in which a series of said reflectors included in said circular row envelops one trunconic surface, a further series of said reflectors included in said circular row envelops another trunconic surface, the angle of which with reference to said axis is somewhat smaller than the angle of said first named trunconic surface with said axis, said first series of reflectors being adapted to reflect the light on a circular zone and said second series of reflectors, which are greater in number than said first series, being adapted to reflect the light on a substantially annular zone surrounding said first circular zone.

LOUIS NICOLAS MESTRE.